F. J. TONE.
PROCESS OF PRODUCING SILICON CARBID.
APPLICATION FILED APR. 1, 1908.
937,119.
Patented Oct. 19, 1909.
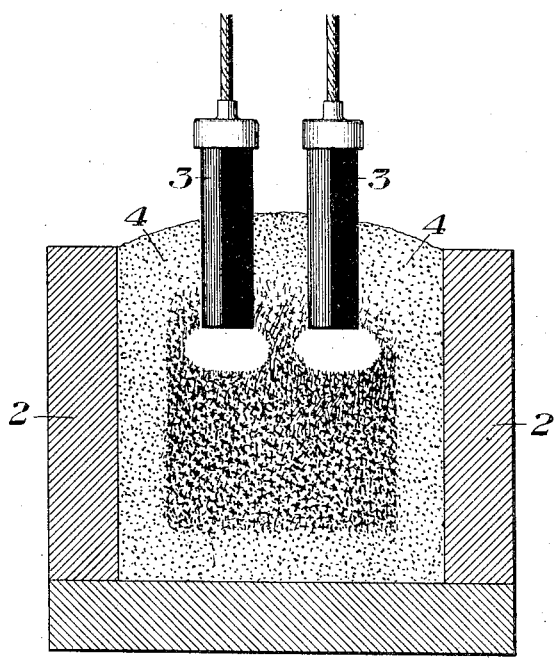

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF PRODUCING SILICON CARBID.

937,119. Specification of Letters Patent. Patented Oct. 19, 1909.

Application filed April 1, 1908. Serial No. 424,600.

*To all whom it may concern:*

Be it known that I, FRANK J. TONE, of Niagara Falls, Niagara county, New York, have invented a new and useful Improvement in Processes of Producing Silicon Carbid, of which the following is a full, clear, and exact description, reference being had to the accompanying drawings, forming part of this specification, in which the figure is a section of an electric furnace in which I may carry out my process.

My invention relates to the production of silicon carbid, and is designed to provide an improved economical method for the production of the same in grades which are especially adapted for certain purposes in the arts.

As commonly carried out, the manufacture of silicon carbid consists in embedding a resistance conductor in a charge mixture of silica and carbon, passing current through the conductor and generating heat sufficient to reduce the silica and convert it into silicon carbid, the heat being generated entirely on the incandescence principle. I have discovered that silicon carbid can be efficiently produced in the arc furnace and that this method has great advantages when it is desired to use certain grades of crude materials or to obtain silicon carbid of certain specific properties.

Referring to the drawings, 2 is an electric furnace built of refractory material, 3, 3 are carbon electrodes depending vertically into the furnace and surrounded by the mixing charge 4. After the arc is started in the usual manner, the mixing charge 4 is gradually added until it entirely surrounds the electrodes and covers the arc zone. When sufficiently heated that part of the mixing charge within the arc zone and under the electrodes is converted into silicon carbid, and by raising the electrodes from time to time as may be necessary or desired to secure the proper regulation of the current, the finished product builds up to any desired height. Fresh mixture is added around the electrodes from time to time as the charge under treatment is converted into silicon carbid.

If it is desired to run the furnace continuously the finished product may be withdrawn from the column which has built up under the electrodes at the farthest point from the arc zone continuously or intermittently, without shutting down the furnace or disturbing the mass in the vicinity of the reaction zone.

One of the advantages of my improved method is that when the charging mixture contains constituents which make it more or less conductive, such as coke or sand having high percentages of impurities, or when the mixture contains "white stuff", (which term is applied to the partially converted mixture of a silicon carbid furnace which has already been used in the process), the area of the reaction zone is thereby increased and rendered more efficient. It has been found that the silicon carbid formed by this process is of a dense compact variety, and has great toughness. These qualities make it very valuable and efficient, for certain abrasive purposes, as well as for other uses.

My process is not confined to use in the furnace shown, but may be used in any type of arc furnace without departing from my invention, since

What I claim is:—

1. The process of producing silicon carbid, consisting in subjecting a mixture of silicious and carbonaceous material to the heat of an electric arc sufficient to produce silicon carbid and moving the arc zone from the formed silicon carbid in the direction of the unreduced mixture.

2. The process of producing silicon carbid, consisting in introducing a charge of silicious and carbonaceous material into a furnace, subjecting said mixture to the heat of an electric arc, thereby causing a reaction of the mixture to form silicon carbid and moving the arc zone from the formed silicon carbid in the direction of the unreduced mixture.

3. The process of producing silicon carbid, which consists in supplying a charge of silicious and carbonaceous material, maintaining within the charge an electric arc of sufficient heating capacity to produce silicon carbid and moving the arc zone from the formed silicon carbid in the direction of the unreduced mixture.

4. The process of producing silicon carbid, which consists in supplying a charge of silicious and carbonaceous material, maintaining within the charge an electric arc of sufficient heating capacity to produce silicon carbid, allowing the silicon carbid to build up under the electrodes as it is formed, and supplying fresh charges as required.

5. The process of producing silicon carbid, which consists in supplying a charge of silicious and carbonaceous material, maintaining within the charge an electric arc of sufficient heating capacity to produce silicon carbid, allowing a column of silicon carbid to build up under the electrodes as it is formed, withdrawing portions of silicon carbid from the end of the column farthest from the arc zone from time to time and supplying fresh charge as required.

6. The process of producing silicon carbid, consisting in subjecting a mixture of silicious and carbonaceous material to the heat of an electric arc sufficient to produce silicon carbid, said mixture containing partially reduced charge formed in the production of silicon carbid and known as "white stuff" and moving the arc zone from the formed silicon carbid in the direction of the unreduced mixture.

7. The process of producing silicon carbid, which consists in applying a charge of silicious and carbonaceous material, maintaining within the charge an electric arc of sufficient heating capacity to produce silicon carbid, and raising the arc-producing electrodes from time to time to secure the proper regulation of the current and to allow the finished product to build up underneath the electrodes as it is formed.

In testimony whereof, I have hereunto set my hand.

FRANK J. TONE.

Witnesses:
 CHARLES CHORMANN,
 EDMUND S. SMITH.